Feb. 19, 1952       E. M. WARREN       2,586,130
SAFETY DEVICE FOR TRACTORS
Filed May 12, 1949       3 Sheets-Sheet 1
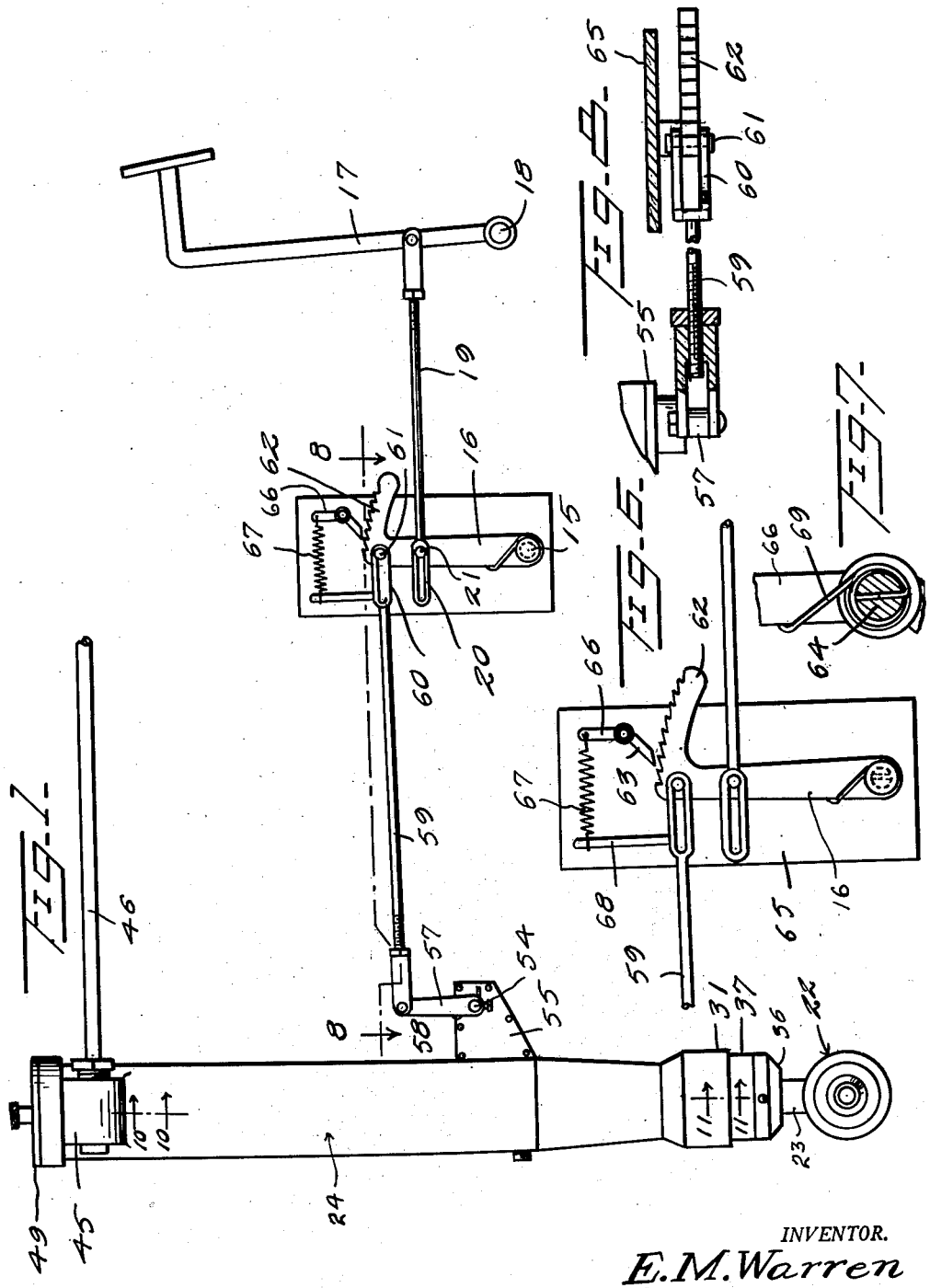
INVENTOR.
E. M. Warren
BY
Kimmel & Crowell Attys.

Feb. 19, 1952 — E. M. WARREN — 2,586,130
SAFETY DEVICE FOR TRACTORS
Filed May 12, 1949 — 3 Sheets-Sheet 2
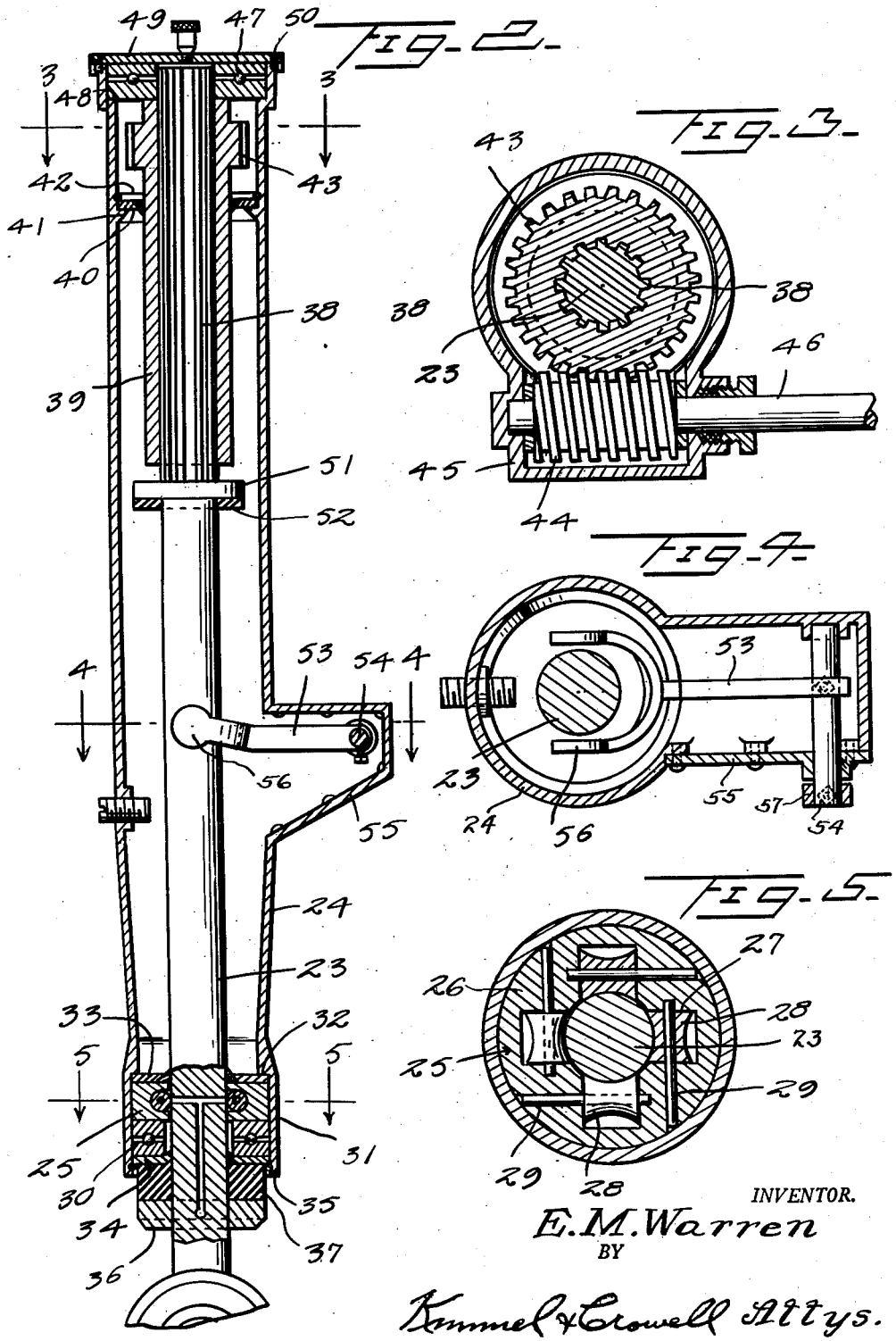
INVENTOR.
E. M. Warren
BY
Kimmel & Crowell Attys.

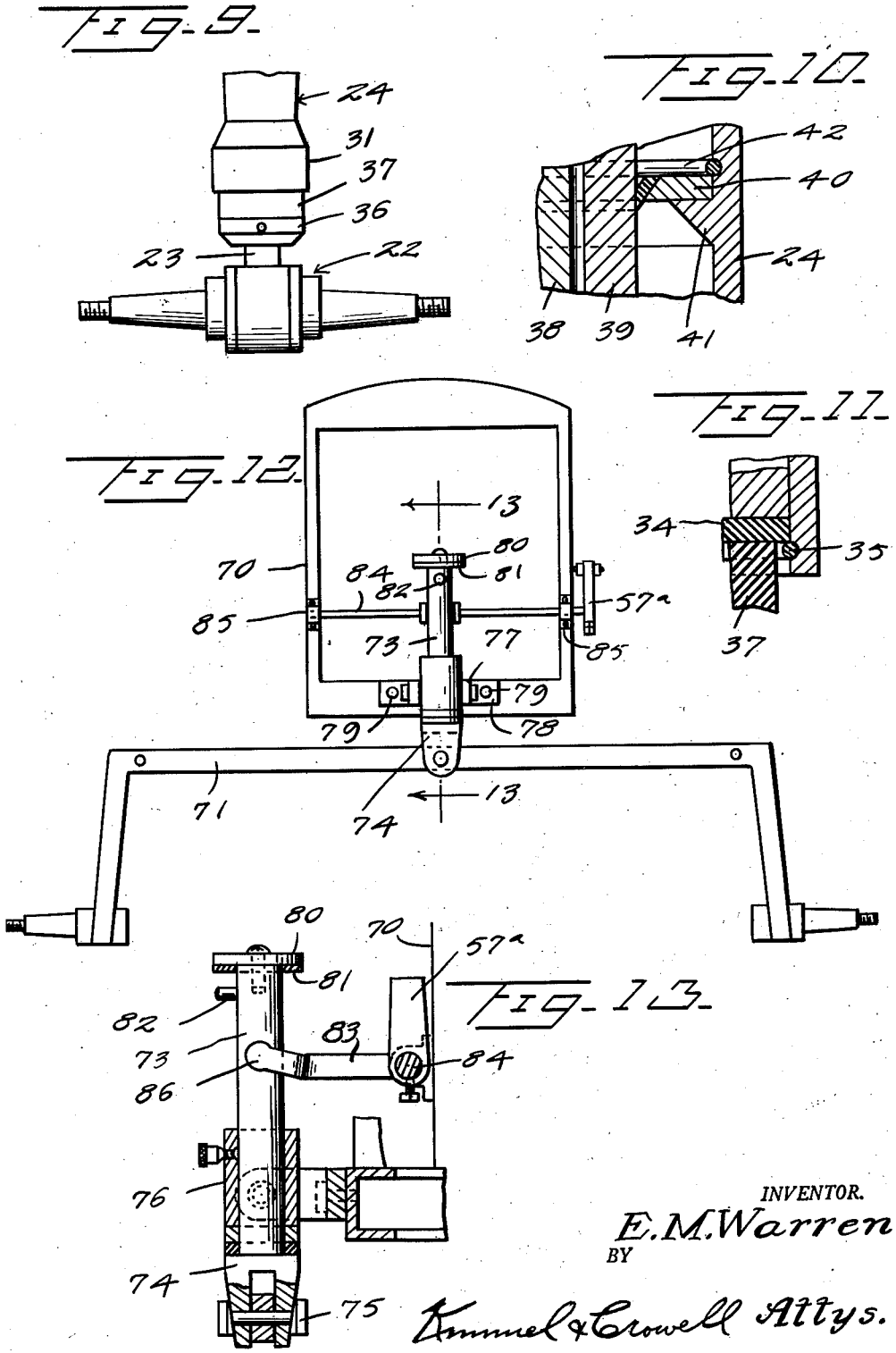

Patented Feb. 19, 1952

2,586,130

UNITED STATES PATENT OFFICE 2,586,130

SAFETY DEVICE FOR TRACTORS

Estel M. Warren, Clinton, N. C.

Application May 12, 1949, Serial No. 92,793

3 Claims. (Cl. 180—82)

1

This invention relates to a safety device for tractors to prevent backward tipping of the tractor.

An object of this invention is to provide in combination with the front bolster or fork of a tractor, means connected to the clutch lever whereby the clutch lever will be moved to declutching position when the front end of the tractor is raised off of the ground for a predetermined distance. In this manner when pull on the tractor is of a degree whereby the front end of the tractor will be lifted from the ground, the rear traction wheels will be declutched from the engine so that the front end will be held against upward movement, thereby preventing the tractor from tipping over backwards with injury to the driver and/or tractor.

Another object of this invention is to combine a safety device of this kind with the fifth wheel of the tractor and also with the steering mechanism.

A further object of this invention is to provide a safety device of this kind which is simple in construction and can be combined with tractors of various types.

With the above and other objects in view, my invention consists in the arrangement, combination and details of construction disclosed in the drawings and specification, and then more particularly pointed out in the appended claims.

In the drawings,

Figure 1 is a detail side elevation of a safety means for a tractor constructed according to an embodiment of this invention, Figure 2 is a vertical sectional view of the forward portion of the device, Figure 3 is a sectional view taken on the line 3—3 of Figure 2, Figure 4 is a sectional view taken on the line 4—4 of Figure 2, Figure 5 is a sectional view taken on the line 5—5 of Figure 2, Figure 6 is a fragmentary enlarged side elevation showing the clutch operator, Figure 7 is a fragmentary sectional view showing the pivoted lock for the clutch operator, Figure 8 is a fragmentary sectional view taken on the line 8—8 of Figure 1, Figure 9 is a fragmentary front elevation of the axle and the lower mounting therefor, Figure 10 is a fragmentary sectional view taken on the line 10—10 of Figure 1, Figure 11 is a fragmentary sectional view taken on the line 11—11 of Figure 1, Figure 12 is a detail front elevation, partly

2 broken away and in section, of a modified form of this device.

Figure 13 is a fragmentary sectional view taken on the line 13—13 of Figure 12.

Referring to the drawings and first to Figures 1 to 11 inclusive, the numeral 15 designates generally a clutch operating shaft having secured thereto a clutch operating lever 16. A clutch pedal 17 is disposed rearwardly of the shaft 15 being rockably mounted on a pivot 18 and connected with the operator 16 by means of an extensible link 19.

The link 19 is adapted to have limited lost motion with respect to the operator lever 16 by means of an elongated loop 20 engaging a headed pin or bolt 21 which is carried by the operator 16. The loop 20 provides a means whereby the clutch lever or operator 16 may be rocked forwardly or counter-clockwise without rocking of the clutch pedal 17.

A front axle 22 is disposed at the front of the tractor (not shown) and is mounted for horizontal rotation by a vertically disposed shaft 23 which rises from the central portion of the axle 22. The shaft 23 extends vertically through an elongated tubular housing 24 and is journalled in an anti-friction bearing means 25 carried by the lower portion of the housing 24. The anti-friction bearing means 25 includes a circular plate 26 formed with notches or slots 27 within which concave rollers 28 carried by roller pins or shafts 29 are adapted to be rotatably mounted.

The shaft 23 also extends through a ball thrust bearing 30 disposed in a bearing housing 31 at the lower portion of the housing 24 and the ball thrust bearing 30 with the anti-friction bearing structure 25 is secured in the bearing housing 31 against endwise movement by forming a shoulder 32 in the upper portion of the bearing housing 31 and interposing a grease retainer 33 between the shoulder 32 and the anti-friction bearing means 25.

A lower grease retainer 34 bears against the lower side of the thrust bearing 30 and the bearing assembly, including the thrust bearing 30 and the anti-friction bearing means 25, is locked in the bearing housing 31 by means of a split locking ring 35.

The shaft 23 has secured thereto a collar 36 and a rubber cushion 37 is interposed between the collar 36 and the lower grease retainer 34. The shaft 23 is provided adjacent the upper end thereof with longitudinally extending splines 38, and a sleeve 39 engages the splines 38 and is centrally disposed in the housing 24, being supported centrally of the housing by means of upper ball bearing 47.

An upper grease retainer 40 seats on a flange 41 carried by the housing 24. A lock ring 42 is adapted to lock the grease retainer 40 onto the shoulder or flange 41. The sleeve 39 has fixed adjacent the upper end thereof a worm gear 43 with which a worm 44 is adapted to mesh. The worm 44 is rotatably disposed in a laterally offset housing 45 carried by the upper portion of the housing 24, and a steering shaft 46 is secured to the worm 44 and extends rearwardly to a convenient position for operation by the operator of the tractor.

Upper ball bearing or collar 47 seats on a shoulder 48 formed in the housing 24, and a cap 49 is secured by fastening means 50 to the upper end of the housing 24.

The shaft 23 has fixed thereto a collar 51 which is disposed below the sleeve or guide 39, and a rubber cushion 52 engages about the shaft 23 and bears against the lower side of collar 51. A forked rock lever 53 is secured to a shaft 54 journalled across a rearwardly offset housing 55 carried by the housing 24. The forked or forward ends 56 of the lever 53 straddle the shaft 23 and are adapted to be engaged by rubber cushion 52 and collar 51 when shaft 23 drops downwardly a predetermined distance.

Shaft 54 has secured thereto a crank arm 57 disposed on the outer side of the housing 55, and a spring 58 constantly urges the crank 57 to rock clockwise. The crank 57 is connected with the clutch lever or operator 16 by means of an elongated link 59 formed with an elongated loop 60 engaging a headed pin or bolt 61 which is carried by the lever 16. The loop 60 provides a lost motion between lever 16 and link 59 when lever 16 is rocked forwardly or counter-clockwise by depression of the clutch pedal 17 in the normal operation of the clutch.

The lever 16 has fixed to the upper end thereof a toothed bar or rack 62 which is adapted to be engaged by a spring-pressed pawl or locking member 63 rockably mounted on a shaft 64 carried by a plate 65. The pawl 63 includes an upwardly projecting arm 66 with which one end of a pawl operating spring 67 is connected. The opposite or forward end of spring 67 is secured to an upwardly projecting arm 68 which is carried by the rear end of link 59. In this manner when the link 59 is pulled forwardly by downward rocking of the fork lever 53, spring 67 will be tensioned to a degree sufficient to overcome the tension of spring 69 which normally holds pawl 63 out of engagement with rack 62. When pawl 63 is rocked downward to engage rack 62, clutch lever 16 will be locked in a declutching position.

Referring now to Figures 12 and 13, there is disclosed a modified form of this invention for use with tractors wherein the front wheels are relatively widely spaced. The tractor 70 has disposed at the forward end thereof a U-shaped axle 71 which is rockably secured to a vertically disposed shaft 73 by means of a U-shaped coupling 74 through which a coupling pin 75 engages. The shaft 73 is slidable in a bushing or bearing 76 which is rockably carried by a pair of forwardly projecting ears 77 carried by a base plate 78 secured by fastening means 79 to the forward portion of the tractor frame.

The mounting comprising the U-shaped member 74 and the ears 77 which project from the tractor frame, provide a substantially universal rocking movement for the axle 71. The shaft 73 has fixed thereto a collar 80 and a rubber cushion 81 is disposed about the shaft 73 and engages the lower side of collar 80. A forwardly projecting stop pin 82 is fixed to the shaft 73 and is adapted to engage the upper end of the bearing 76 upon downward movement of the shaft 73 to limit the downward movement of this shaft.

A forked rock lever 83 is carried by a rock shaft 84 journalled in bearings 85 which are fixed to the tractor, and the arms 86 of fork lever 83 engage loosely about the shaft 73 in the same manner as the fork arms 56. It will be understood that the remaining structure shown in Figures 1, 6, 7 and 8 will be associated with fork lever 83 so that the clutch shaft 15 may be rocked counter-clockwise to declutching position when crank arm 57a, similar to crank arm 57, is rocked counter-clockwise.

In the use and operation of this device, the steerable axle 22 will have a pair of wheels rotatably mounted thereon, with the wheels relatively closely spaced from each other. The axle 22 may be steered by turning of the steering shaft 46 which will rotate shaft 23 about the vertical axis thereof. In the event the tractor rises upwardly at the forward end thereof, with the wheels off of the ground, shaft 23 will drop downwardly and if the inclination of the tractor approaches a turning backward point, fork lever 53 will at this time be rocked downwardly by collar 51 and rubber cushion 52. Downward rocking of fork lever 53 will pull link 59 forwardly and clutch operator 16 will be rocked counter-clockwise to a declutching position. Spring 67 will at this time swing locking pawl 63 downwardly to rack engaging position so that clutch operator or lever 16 will be locked in its declutching position. As soon as power has been disengaged from the traction wheels of the tractor, the forward end thereof will swing downwardly so that the front wheels will contact the ground and in order to release locking pawl 63 the clutch pedal 17 may be pressed forward.

With a safety means as hereinbefore described, the tractor will be prevented from turning over backwards to injure the operator or cause damage to the tractor.

I do not mean to confine myself to the exact details of construction herein disclosed, but claim all variations falling within the purview of the appended claims.

What I claim is:

1. In a tractor, a steerable front axle, a vertical shaft pivotally secured to said axle to permit pivoting thereof in a vertical plane, means mounting said shaft on said tractor for combined rotary movement and vertical sliding movement relative to said tractor, a clutch shaft, a lever secured to said clutch shaft, a bifurcated rock lever disposed for engagement with said vertical shaft, a collar on said vertical shaft engageable with said rock lever on downward vertical movement of said shaft and a connection between said rock lever and said first named lever whereby said clutch shaft will be rocked to declutching position upon vertical movement of said first named shaft in one direction.

2. In a tractor, a steerable front axle, a vertical shaft pivotally secured to said axle, splines on said shaft, a grooved sleeve engaging said splines whereby said shaft is mounted for combined rotary movement and vertical sliding movement relative to said tractor, a clutch shaft, a lever secured to said clutch shaft, a rock lever disposed for engagement with said vertical shaft, a connection between said rock lever and said first named lever and a connection between said first mentioned shaft and said rock lever whereby said clutch shaft will be rocked to declutching position upon vertical movement of said first named shaft in one direction, and means for turning said first named shaft.

3. In a tractor, a steerable front axle, a vertical shaft pivotally secured to said axle, splines on said shaft, a grooved sleeve engaging said splines, steering means for rotating said sleeve whereby combined rotary movement and vertical sliding movement relative to said tractor is permitted said shaft, a clutch shaft, a lever secured to said clutch shaft, a rock lever disposed for engagement with said vertical shaft, a collar on said shaft above said rock lever for moving said rock lever upon vertical downward movement of said shaft, a connection between said rock lever and said first named lever whereby said clutch shaft will be rocked to declutching position upon vertical movement of said first named shaft in a downward direction, and latching means for latching said first named lever in declutching position.

ESTEL M. WARREN.

REFERENCES CITED

The following references are of record in the file of this patent:

UNITED STATES PATENTS

| Number | Name | Date |
| --- | --- | --- |
| 1,418,619 | Cain | June 6, 1922 |
| 1,421,521 | Maxwell | July 4, 1922 |
| 1,433,202 | Grasswick | Oct. 24, 1922 |
| 1,607,185 | Cormier et al. | Nov. 16, 1926 |